(12) United States Patent
Ibañez Cruz

(10) Patent No.: US 11,169,596 B2
(45) Date of Patent: Nov. 9, 2021

(54) POSITIONING SYSTEM

(71) Applicant: VIRTUALWARE 2007, S.A., Basauri (ES)

(72) Inventor: Javier Ibañez Cruz, San Antonio de Benageber (ES)

(73) Assignees: Javier Ibañez Cruz, San Antonio de Benageber (ES); VIRTUAL WARE 2007, S.A., Basauri (ES)

( * ) Notice: Subject to any disclaimer, the term of this patent is extended or adjusted under 35 U.S.C. 154(b) by 55 days.

(21) Appl. No.: 16/624,529

(22) PCT Filed: Jun. 20, 2018

(86) PCT No.: PCT/ES2018/070435
§ 371 (c)(1),
(2) Date: Dec. 19, 2019

(87) PCT Pub. No.: WO2019/008200
PCT Pub. Date: Jan. 10, 2019

(65) Prior Publication Data
US 2021/0149477 A1    May 20, 2021

(30) Foreign Application Priority Data
Jul. 4, 2017   (ES) ............................... ES201730883

(51) Int. Cl.
*G09G 5/00* (2006.01)
*G06F 3/01* (2006.01)
(Continued)

(52) U.S. Cl.
CPC ............ *G06F 3/011* (2013.01); *A63F 13/213* (2014.09); *A63F 13/428* (2014.09); *G01S 5/16* (2013.01); *G06F 3/0325* (2013.01)

(58) Field of Classification Search
CPC .......... G06F 1/163; G06F 3/012; G06F 3/013; H04N 5/23203; H04W 4/80
See application file for complete search history.

(56) References Cited

U.S. PATENT DOCUMENTS

2008/0281553 A1* 11/2008 Frank ........................ G01S 5/16
   702/150
2016/0379074 A1* 12/2016 Nielsen .................. H04N 7/181
   348/143

FOREIGN PATENT DOCUMENTS

JP       2006033329 A      2/2006

OTHER PUBLICATIONS

International Search Report for corresponding PCT application No. PCT/ES2018/070435 dated Jun. 20, 2018.
(Continued)

*Primary Examiner* — Insa Sadio
(74) *Attorney, Agent, or Firm* — Notaro, Michalos & Zaccaria P.C.

(57) ABSTRACT

Especially designed for large covered spaces, the system is made up of a series of conveniently distributed static spatial modules (1) and a series of tracking units (2), associated with each player or user, so that the spatial modules (1) are formed by a square panel, in which two groups of LED diodes of different types visible spectrum reference LEDs (5) and infrared identification LEDs (6) are integrated, each spatial module (1) including configuration means for its identification diodes (6) as well as power supply means or means for connecting to a power supply. Simultaneously, the tracking units (2) include a series of cameras (7) with different orientations, associated with an image-processing unit (8), having a communications port (9) and electrical power supply means (10). The system is complemented by software for processing the information sent and previously managed by the tracking units, which can be implemented
(Continued)

indistinctly via the processing unit associated with each tracking unit or in a more powerful external processing unit, via a communication network.

4 Claims, 2 Drawing Sheets

(51) Int. Cl.
*A63F 13/213* (2014.01)
*A63F 13/428* (2014.01)
*G01S 5/16* (2006.01)
*G06F 3/03* (2006.01)

(56) References Cited

OTHER PUBLICATIONS

Dongdong Weng et al.: "Study on an Indoor Tracking System Based on Primary and Assistant Infrared Markers", Computer-Aided Design and Computer Graphics, 2007 10th IEEE International Conference On, IEEE, PI, Oct. 18, 2007 (Oct. 18, 2007), pp. 377-382, XP031193809, ISBN: 978-1-4244-1578-6; https://ieeexplore.ieee.org/document/4407912; retrieved Jun. 29, 2021.
Huang Y et al., "Key Issues of Wide-Area Tracking System for Multi-user Augmented Reality Adventure Game", Image and Graphics, 2009. ICIG '09. Fifth International Conference On, IEEE, Piscataway, NJ, USA, (Sep. 20, 2009), ISBN 978-1-4244-5237-8, pp. 646-651, XP031652829.
Welch G et al, "High-Performance Wide-Area Optical Tracking The HiBall Tracking System", Presence, Cambridge, MA, US, (Feb. 1, 2001), vol. 10, No. 1, doi:10.1162/105474601750182289, ISSN 1054-7460, pp. 1-21, XP002382939.
Mark Ward et al., "A demonstrated optical tracker with scalable work area for head-mounted display systems", Proceedings / 1992 Symposium On Interactive 3D Graphics, Cambridge, Massachusetts, Mar. 29-Apr. 1, 1992, ACM Press, Cambridge, Massachusetts, United States, (Jun. 1, 1992), doi:10.1145/147156.147162, ISBN 978-0-89791-467-3, pp. 43-52; http://dx.doi.org/10.1145/147156.147162; retrieved Jun. 29, 2021.
Maesen S et al., "Scalable optical tracking for navigating large virtual environments using spatially encoded markers.", VRST—Proceedings of the 19th ACM Symposium on Virtual Reality Software and Technology, VRST 2013 2013 Association for Computing Machinery usa, (Nov. 30, 2012), ISBN 978-1-4503-2379-6, pp. 101-110, XP055565049; http://dx.doi.org/10.1145/2503713.2503733; retrieved Jun. 29, 2021.
Written Opinion of the corresponding priority application No. ES 201730883, dated Dec. 21, 2017.
International Search Report for corresponding PCT application No. PCT application No. PCT/ES2018/070435, dated Oct. 24, 2018.
European Search Report for corresponding European Patent application No. EP 18827559, dated May 7, 2020.

* cited by examiner

POSITIONING SYSTEM

OBJECT OF THE INVENTION

The present invention relates to a positioning system, more specifically for positioning objects in different types of spaces for multiple applications.

The object of the invention is to provide a positioning system which can be effectively applied in enclosed spaces, without generating "dead zones" due to the existence of obstacles such as columns, hallways, etc., and without a user limit.

BACKGROUND OF THE INVENTION

Up until now, in some existing positioning systems there are a plurality of cameras located in the operating space participate, such that each user of the system has a helmet, glasses or a similar element wherein one or more identifying LEDs are arranged which are identified through the aforementioned cameras by means of the corresponding identification software, such that said identification is not possible when the operating space includes obstacles to the vision of the cameras, such as columns, bulkheads, hallways, etc.

In the same manner, this type of system has a limited number of users or players, due to the limitation in the identification means of each user, meaning the limitation of colours offered by the diodes used, or if several are used, the spatial arrangement thereof for carrying out said identification, for which reason in certain types of games or spaces (museums for example), they are clearly insufficient.

Trying to get around this problem, in a purely theoretical manner, the publication "Study on an Indoor Tracking System Based on Primary and Assistant Infrared Markers", describes a hypothetical system for locating and tracking independent users in augmented reality applications based on infrared markers located in the ceiling of a large indoor installation.

The proposed system uses computer vision techniques to track the head of the user wearing a helmet (HMD) with a built-in camera to capture the images of the markers which are transmitted to a laptop through a USB 2.0 connector, the synchronisation between markers and camera not being necessary.

The system envisages two types of markers: secondary markers, consisting of 9 infrared LEDs, activated during the entire registration process, and primary markers, specifically 4 infrared LEDs, controlled to flash with a given coding pattern.

Although this system would solve the aforementioned problem, the article itself recognises the lack of viability of the project with current technology, highlighting the following technical problems:
- Spatial units are active elements with variable lighting, which complicates the recognition process.
- The information captured by the cameras is serially decoded over time, which requires a minimum number of frames in order to obtain the recognition of the identification, producing a minimum waiting time to obtain the positioning.
- When using infrared diodes both to position and identify, it is necessary to apply specialised filters to let only the infrared pass through to the cameras, the predominant noise in the infrared component affecting the positioning.
- It requires a historical control synchronised with the LEDs turning on, which increases the probability of error.

DESCRIPTION OF THE INVENTION

The positioning system contemplated herein offers a completely satisfactory solution to the problem set out above, in the different aspects mentioned.

To do so, two types of fundamental elements participate in the system of the invention which interact with each other in order to provide the system with the absolute position of each user in a global reference system referring to the specific position of each user.

More specifically, it is envisaged that the interaction space or absolute reference system can be divided, in plan view, into a series of sectors in order to cover the tracking area, in each of which a spatial module is established, located in the ceiling or suspended therefrom, as long as it is above the maximum height of the objects or users to be positioned, each module being a static element made of a square panel with pre-established dimensions, which integrates a set of LEDs adopting a certain configuration.

The LEDs participating in these modules are differentiated into two types, on the one hand reference LEDs are defined, which emit light at a visible wavelength, and on the other hand identification LEDs are established, the wavelength of which is infrared, in order to hide the identification from the naked eye, such that the software enables the quick and simple distinction thereof.

The reference LEDs are turned on in the same manner on all the panels, while the identification LEDs are turned on representing an identifier associated with the corresponding panel.

The identification LEDs also enable the orientation of the panel and consequently the position of the user to be known.

Each panel can be configured for any identifying element by means of an external element which communicates through an unpluggable connector.

The panel can be a printed circuit board (PCB) wherein both the LEDs and the electronic components necessary for launching it are soldered.

Each panel is completely passive, such that once they receive power through a power connector, the LEDs turn on and continuously remain in this state.

The second group of elements participating in the system of the invention are the tracking units, units which will be associated with each user or player and which consist of an independent element capable of recognising the LEDs of the panels in dim ambient lighting conditions.

To do so, these tracking units incorporate a series of duly oriented cameras, associated with an embedded image processing unit, having a communications port and essential power supply means, whether they are batteries or wires.

The tracking unit uses a single camera at any given time, and the system itself, according to the pose thereof, selects the most suitable camera such that it observes the largest number of spatial modules such that the plane of the nearest spatial module is as perpendicular as possible to the optical axis of the camera.

The cameras are arranged such that each of the axes thereof points in a different direction, so that the field of vision of the assembly covers a wide field, keeping overlapping margins between them.

This device can be wireless or not, when communicating with an element which uses the absolute position of the tracking unit in the reference system associated with the spatial modules, this element being conventional and therefore remaining outside the object of the present invention.

Starting from this structuring, and as mentioned previously, the tracking unit, through its own processing unit, calculates the relative position thereof based on the closest spatial modules identified by the cameras thereof.

Regarding the acquisition and processing of the images, in a continuous video mode, the sensor of the active camera obtains the image under a fixed parameter configuration, wherein a reduced exposure time is used in order to eliminate the noise from the ambient light, producing a clean image of the LEDs on an empty background.

The image is then subdivided in order to be processed in portions in different threads of execution. Each of them locates the centres of the LEDs, which in the image are centred in pixel blobs and their coordinates are stored in the image plane. Once the portions have been processed, all the blobs are put together and classified into reference blobs and identification blobs.

In this manner, an embedded image processing system is used, without needing to send all the information to the PC, achieving low latency access to the image, an essential requirement for the viability of the system, sending only data structures encoded with the information necessary to obtain the pose of the tracking element. This embedded system enables, by means of a multiplexer, the connection from 1 to N cameras, covering the vision area required by each application, without this affecting the processing capacity.

Regarding communications, each of the tracking units sends the list of the located blobs to the equipment wherein the final calculation is performed by means of a communications interface either by local network or by Wi-Fi, if less latency is required.

As stated above, the processing of the information obtained by the tracking units can be carried out through the processing unit associated with them or in an external processing unit with greater power, through a communications network, such that in any of the cases in said processing process, the following operational phases will be carried out:

Distortion correction
The coordinates obtained by the image recognition algorithm are corrected by applying the distortion of the lens by means of a system which uses the intrinsic matrix of the camera and the distortion coefficients according to the model used.

Identification algorithm
Once the list of blobs without distortion is available, the identification algorithm is executed for each of the tracking units. The algorithm first locates the reference blobs, which enable it to project an internal grid on each panel. On this grid, it checks whether or not blobs fall into each of the squares thereof and the matrix associated to the panel is obtained. This matrix contains the orientation and the ID of the panel. In this manner, each of the real LEDs is able to be identified with the located blobs.

Obtaining the 3D position
Once all the blobs have been associated with the corresponding real LED thereof, an algorithm is applied to solve the "Perspective-n-Point" problem, which can be solved by several optimisation methods, in this case using a method which iteratively minimises the reprojection error. From this, the position and orientation of the reference system of the camera in the absolute reference system are obtained.

Acquisition of the inertial unit
As an improvement for the stability and filtering, the data of an IMU (inertial measurement unit) may or may not be obtained, in order to combine it with the data obtained from the optical system, since these sensors have a much higher refresh rate than the frames per second enabled by the camera.

Filter and sensor fusion
Finally, a filter is applied which combines the fusion of sensors between the data both from the optical system and the inertial system, as well as the past states thereof.

The final result is obtaining the position in vector mode X, Y, Z and the orientation in quaternion representation X, Y, Z, W of each of the tracking units. This process is performed at a minimum of 40 Hz and in an independent manner.

Starting from this structuring, the following advantages are derived:

The use of the grid-like system where all the elements in it are passive and identical, make it an area-scalable system, only limited by the number of bits of the identification LEDs, such that with a 16-bit number a tracking area equivalent to an area larger than 20,000 m2 is obtained.

Since it is an "inside-out" system, meaning a system wherein each element has its own internal position, it is also scalable with respect to objects which are positioned simultaneously, because due to the fact that they are independent from each other, increasing the number of positioned elements does not affect the technical specifications.

Since the reference system obtained from the spatial modules is located in the ceiling above the users, there is a camera pointing in that direction at all times for which reason the obstruction between objects is minimal, being able to move closer to one another as long as they are not placed on top of each other.

The spatial modules are passive, such that the complexity of the system does not increase with the area, they only require a connection to a power supply in any standard outlet by means of a power source, the lighting of the LEDs being static, which simplifies the recognition, being more robust and scalable.

The recognition of the identification and positioning is obtained unequivocally with a single frame, without needing to serially decode information over time, which enables the position to be recovered after a possible disconnection without needing a minimum wait The use of several multiplexed cameras results in a larger field with good resolution, without losing processing capacity or precision in the processing.

The system combines both infrared LEDs for identification, and LEDs in the visible range for positioning, such that the application of specialised filters is not necessary in order to let only the infrared light pass through to the cameras, thus the predominant noise in the infrared component does not affect the positioning. The references obtained by the visible LEDs are more stable.

The optical positioning system is combined with inertial units in order to improve response time and reduce noise in the final position.

The simultaneous use of two wavelengths greatly simplifies the identification algorithm of the identification, such that the overall latency of the system is reduced, as well as the necessary processing capacity.

DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented.

PREFERRED EMBODIMENT OF THE INVENTION

In light of the aforementioned figures, it can be seen how the positioning system for virtual reality object of the invention is made up of two fundamental elements, a series of spatial modules (1) which are static and conveniently distributed on top of the operating surface and a series of tracking units (2), associated with each player or user.

Figure 3:
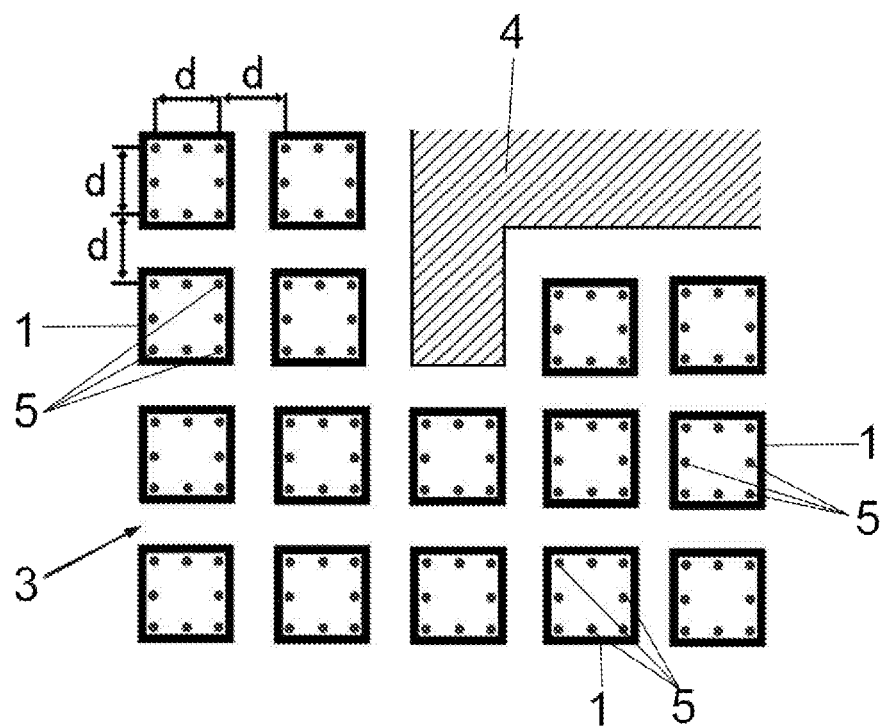
FIG. 3 shows a plan view of the possible distribution of the spatial modules on an operating surface whereon irregular areas are defined.

As seen in FIG. 3, it is envisaged that the interaction space (3) or absolute reference system is divided, in plan view, into a series of equidistant and contiguous sectors or cells, in each of which a spatial module (1) is established, such that said modules are all arranged equidistantly, at a distance (d), adapting to the irregularities (4) in situ that said interaction space (3) may have.

Figure 2:
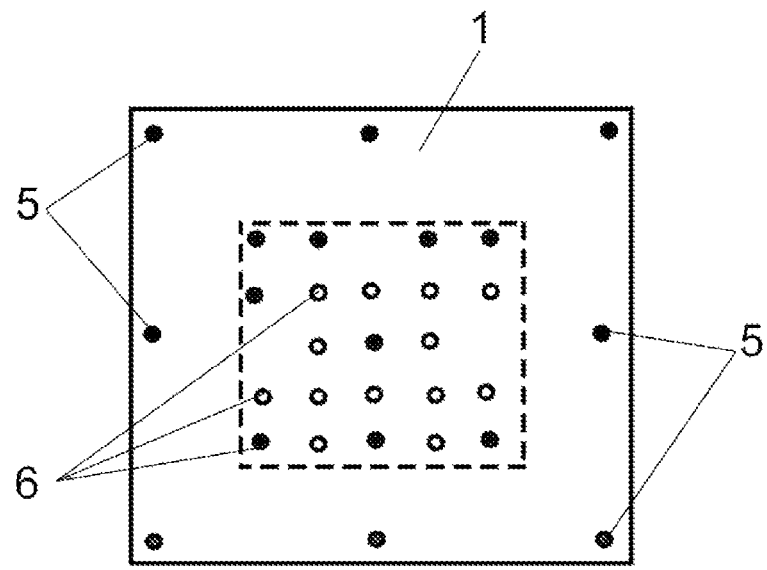
FIG. 2 shows a schematic detail of the configuration of one of the spatial modules participating in the system of the invention.

According to FIG. 2, the spatial modules (1) are made of a square panel, wherein two groupings of LEDs of different types are integrated.

More specifically, a series of reference LEDs (5) and a series of identification LEDs (6) are established in said modules.

The reference LEDs (5) emit light at a visible wavelength, while the identification LEDs (6) will emit at an infrared wavelength, such that the software enables the distinction thereof.

In this manner, the reference LEDs (5) are turned on in the same manner in all the panels, while the identification LEDs are turned on representing an identifier associated with the corresponding panel, likewise enabling the orientation of the panel and consequently the position of the user to be known.

In this manner, each panel or spatial module (1) can be configured for any identifying element by means of an external element which communicates through an unpluggable connector.

Preferably, the invention foresees the use of 8 LEDs in the visible range for positioning, and 16 infrared LEDs with a binary coding for identification, in addition to 6 infrared LEDs for correcting errors and accelerating the search algorithm. However, this solution is due to simple design criteria, such that the number of reference LEDs in the visible range could be reduced to 4 (never less than this), this distribution being optimal from the exclusive point of view of the panel, although it entails greater complexity in the recognition process, for which reason the participation of 8 LEDs has been chosen in the exemplary embodiment. As for the rest of the LEDs, the number thereof could also vary depending on different design criteria.

The panel can be a printed circuit board (PCB) wherein both the LEDs and the electronic components necessary for launching it are soldered.

Figure 1:
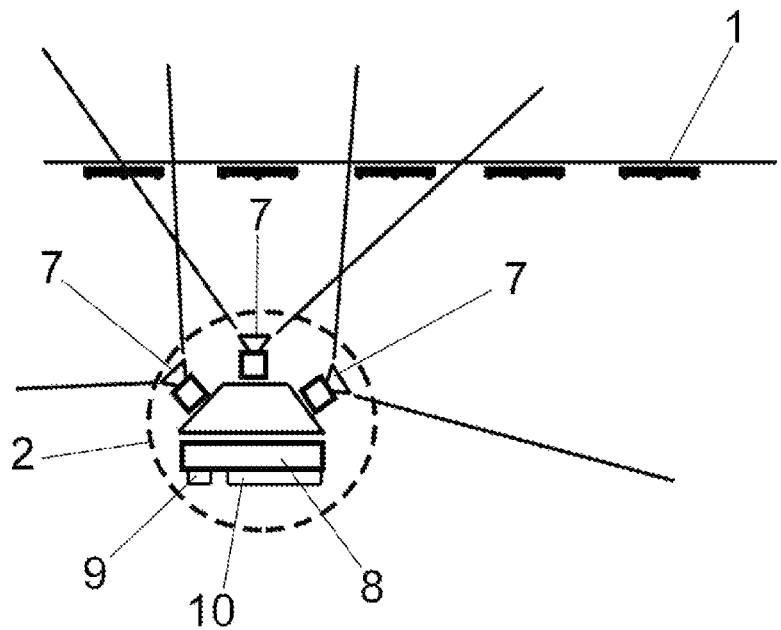
FIG. 1 shows an elevation view of the fundamental elements participating in a positioning system carried out in accordance with the object of the invention.

Moreover, and according to FIG. 1, the tracking units (2) associated with each user or player consist of an independent element capable of recognising the LEDs (5-6) of the panels of each spatial module (1) in dim ambient lighting conditions.

Said tracking units (2) incorporate a series of duly oriented cameras (7), associated with an image processing unit (8), having a communications port (9) and essential power supply means (10).

The tracking unit (2) uses a single camera at any given time, and the system itself, according to the pose thereof, selects the most suitable camera such that it observes the largest number of spatial modules such that the plane of the nearest spatial module is perpendicular to the optical axis of the camera.

As mentioned previously, the cameras (7) are arranged such that each of the axes thereof points in a different direction, so that the field of vision of the assembly covers a wide field, keeping overlapping margins between them.

Finally, it only remains to point out that the tracking units (2) can be wireless or not, when communicating with virtual reality glasses or an element responsible for carrying out the generation of the images depending on the relative position within the reference system of each user, although the invention aims to be independent of the means with which said specific positional representations are eventually carried out, focusing exclusively on the system by means of which it is possible to carry out the positioning of the users of the system.

The invention claimed is:

1. A positioning system constituted from a series of spatial modules (1) and a series of tracking units (2), associated with each player or user,
   wherein the spatial modules (1) are distributed on top of an operating surface according to a distribution based on equidistant and contiguous cells,
   wherein the spatial modules (1) comprise a panel equipped with identification LEDs (6) and reference LEDs (5),
   wherein each spatial module (1) includes an electronics configuration for the identification LEDs (6) thereof, as well as a power connector,
   wherein the spatial modules (1) are static,
   wherein the reference LEDs (5) have a wavelength in the visible range,
   wherein the identification LEDs (6) have an infrared wavelength,
   wherein each spatial module (1) has an identical configuration for the reference LEDs (5) and a specific configuration of identification LEDs (6) of a corresponding panel and orientation of the same,
   wherein the tracking units (2) incorporate a series of cameras (7) with different orientations, an embedded image processing unit (8) with an image preprocessing system, to preprocess images of the cameras (7), and select, at any given time according to a pose, an active camera best positioned a communications port (9) and corresponding electrical power supply (10); having envisaged the inclusion of software for processing information obtained by the tracking units (2) which can be implemented in the embedded processing unit (8) of tracking units (2) or in an external process unit with greater processing capacity, through a communications network.

2. The positioning system according to claim 1, characterized in that each panel or spatial module (1) includes an external connector to configure the identifying element on the identification LEDs (6).

3. The positioning system, according to claim 1, characterized in that a set of 4 LEDs in the visible range participates in each spatial module (1) for the positioning.

4. The positioning system, according to claim 1, characterized in that a set of 8 LEDs in the visible range participates in each spatial module (1) for the positioning.

* * * * *